INVENTORS
HARRY W. RUBINSTEIN
SIDNEY B. WILLIAMS
BY JOHN E. DORNFELD

Connolly and Hutz
ATTORNEYS

United States Patent Office 2,968,752
Patented Jan. 17, 1961

2,968,752

MULTIPLE CAPACITOR

Harry W. Rubinstein, Sidney B. Williams, and John E. Dornfeld, Milwaukee, Wis., assignors to Sprague Electric Company, North Adams, Mass., a corporation of Massachusetts Filed Jan. 24, 1957, Ser. No. 636,042

6 Claims. (Cl. 317—242)

This invention relates to improvements in capacitors of the type having a ceramic dielectric with metallic coatings on opposite sides as the electrically conductive plates.

Heretofore servicemen for electronic devices have had to keep on hand a large stock of capacitors to meet demands for many different capacitance values required in servicing such devices. The number of capacitance values required in service is indicated by listings published by RETMA (Radio Electronics Television Manufacturers Association), the list being divided into groups having different standard tolerances of ±5%, ±10% or ±20% of the rated capacitance or having a guaranteed minimum value (GMV) capacitance. For example, the ±20% (500 v. D.C.) group has a range of capacitance values of .00005–.05 mf. while the GMV group (same voltage) has a range of capacitance value of .001–.03 mf. so that forty-two of the individual capacitors heretofore available were required to meet demands for the capacitance values of .0004–.015 microfarads included in the above two RETMA groups and frequently required by servicemen. Warehousing of such quantities of one electronic component requires considerable investment in inventory, substantial space and constant care to keep capacitors of the various values readily accessible. Few servicemen are equipped to carry enough capacitors to meet all needs on service calls, so that return trips to a warehouse are frequently necessary to obtain a capacitor of a required value.

It is therefore one object of the present invention to provide a capacitor having a plurality of plates on each of two opposite sides of a ceramic dielectric and with each of the plates provided with a lead, and in which a range of capacitance values can be obtained merely by varying the combination of the leads used.

Another object of the invention is to provide a capacitor with ceramic dielectric and with plural electrically conductive coatings on opposite sides and separately provided with leads and in which the conductive coatings are so shaped and placed and of such size that a number of different capacitance values are obtainable by interconnection of leads from conductive coatings on the same or on opposite sides of the dielectric.

Advantages and objects other than those above set forth will be apparent from the following description when read in connection with the accompanying drawing in which.

The mathematical ratios of conductive coating sizes and shapes together with thickness and dielectric constant of the ceramic must be determined to provide a desired capacity range. For example, on a given ceramic dielectric body when the ratio of sizes and shape of the overlapping conductive plate areas is 1:1, 1:2, 1:3, 1:4, the capacitance range of the lowest to the highest capacity values will be in the ratio of approximately 1:5. Other capacity ranges can be obtained by calculation of overlapping plate area ratios and selection of dielectric materials. For example, a capacitor with four electrodes and four terminals and providing three overlapped areas only may have overlapped ratios of 1:1, 1:2, 1:4 to produce capacitance values of .6–7.0 mf. (ignoring edge effect). At least nine capacitance values intermediate the extremes of the above range could be obtained by proper choice of lead connections to the overlapping areas. Such capacitor would not however meet the servicing needs encountered for radio and television equipment in common use at the present time.

Figure 1:
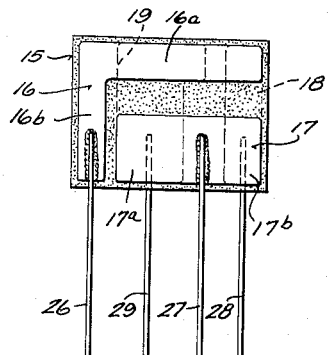
Figure 1 is an elevation of one side (herein called the front side) of the present capacitor, with the leads from the other side (herein called the reverse side) also shown.
Figure 2:
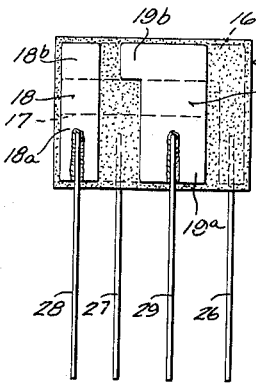
Figure 2 is an elevation of the reverse side of the present capacitor, with the leads from the front side also shown.
Figure 3:
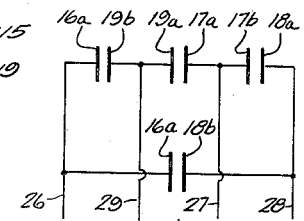
Figure 3 is a conventional diagram of connection of four capacitances obtainable with the present construction.

Referring to the drawings, the numeral 15 designates a ceramic plate of high dielectric constant (K) value with conductive coating 16 and 17 on its front side (Figure 1) and conductive coatings 18 and 19 on its reverse side (Figure 2). The conductive coatings 16, 17, 18 and 19, respectively, have leads 26, 27, 28 and 29 conductively attached thereto, as terminals which are to be variously interconnected and used to obtain a variety of desired capacitance values. It will be noted that the dielectric 15 is of rectangular shape and that its front side bears the coating 16 which has a leg 16b extending closely adjacent the edge and across the width of the dielectric at one end while a coating leg 16a extends closely adjacent the edge and along the length of the dielectric. The coating leg 16b is substantially narrower than the coating leg 16a and the relative proportions of such legs are taken into account in achieving the present result.

Coating 17 is substantially rectangular and extends along and from a portion of the edge along the width of the dielectric and along and from a portion of an edge along the length of the dielectric. The coating 17 is approximately two times the width of the coating 16b and its length is approximately two times its width.

On the reverse side of the dielectric 15, the coating 18 of rectangular shape extends along the edge and across the width of the dielectric so that such coating overlaps portions of coating leg 16a and coating 17 on the front side. The coating 18 is approximately the width of the coating leg 16a. The coating 19 has a leg 19b which extends along a portion of the length of the dielectric and adjacent the edge thereof and a leg 19a which extends across the width of the dielectric to adjacent the other edge and the entire coating 19 is in the central area of the dielectric and lengthwise thereof and overlaps coating portion 17a and a part of coating portion 16a.

Comparison of coating 16 and 17 shown in full line in Figure 1 and of coatings 18 and 19 shown in dotted line in such figure (and vice versa in Figure 2) shows that a portion of the coating 18 coacts with a portion of leg 16a of coating 16 and portion 17b of coating 17, the coacting coating portions 16a, 19b and 16a, 18b being on opposite sides of the dielectric and also having edge effects between such coatings. Coating portion 17a is on the opposite side of the dielectric from the coating portion 19a and coating portion 17b is on the opposite side of the dielectric from coating portion 18a. Hence, there are four pairs of conductive plates with opposing areas on the opposite sides of the dielectric. Additional capacity is obtained from the "edge effects" of each such plate with adjacent plates on the same side of the dielectric, the edge effects being obtained by varying the spacing of coating areas which do not form pairs of opposed plates.

Figure 4:
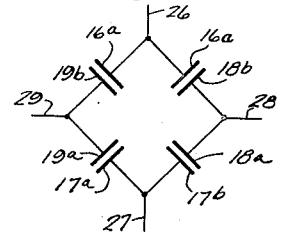
Figure 4 is a simplified diagram of the electrical connections shown in Figure 3.
Figure 5:
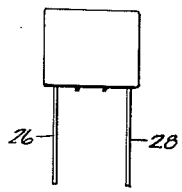
Figures 5–11 are somewhat diagrammatic illustrations of the present capacitor showing various combinations of leads used to obtain capacitance values as given below.
Figure 6:
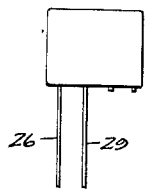
Figure 7:
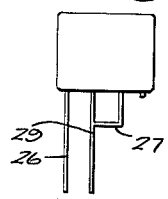
Figure 8:
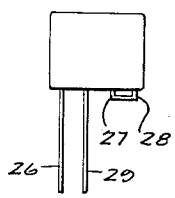
Figure 9:
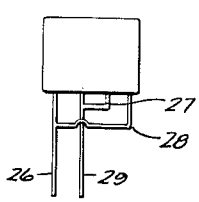
Figure 10:
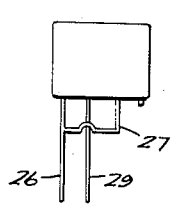
Figure 11:
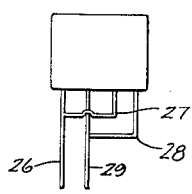

The present capacitor in effect has four capacitances made up of coating portions 16a—16b, 17, 18a—18b, and 19a—19b. Capacitors formed by coating portions 16a—19b, 19a—17a and 17b—18a are connected in series and capacitor 16a—18b is connected in parallel with the first three capacitors. The connections of leads 26, 27, 28 and 29 are most clearly shown in Figure 4 from which the combinations of leads in Figures 5–11 are easily understood.

With a dielectric of K 3500 and thickness of .020", and coatings having overlapping area ratios of 1:1, 1:2, 1:2.54, 1:4 as shown in Figures 1 and 2, it is possible to obtain the following capacitance values which form a part of one RETMA group and in a range frequently desired:

| Figures | Terminals | Connect Leads | microfarad |
|---|---|---|---|
| 5 | 26, 28 | | .001 |
| 6 | 29, 27 | | .015 |
| 7 | 26, 27–28 | | .002 |
| 8 | 26, 29 | 27–29 | .0022 |
| 9 | 26–28, 29–27 | | .0025 |
| 10 | 26–27, 29 | | .0033 |
| 11 | 26–27, 29–28 | | .004 |

Hence, it will be seen that seven capacitance values can be obtained from one capacitor disclosed herein; whereas, it had been heretofore necessary to stock and carry seven different capacitors to obtain the above range of values.

By use of a dielectric of K 1200 but of the same thickness and other dimensions and with the same size and shape of coatings as shown in Figures 1 and 2, the same area ratios are obtained but it is possible to obtain another range of useful capacitance values differing very substantially from the range of values given in the above table. Thus, such capacitor, by various connections of leads, can produce twelve capacitance values as follows:

| microfarads | Terminals | Connect Leads | microfarads | Terminals | Connect Leads |
|---|---|---|---|---|---|
| .0004 | 26, 28 | | .00075 | 27, 28 | 26–28 |
| .00017 | 26, 28 | 29–27 | .0008 | 26, 29 | 29–28 |
| .0005 | 26, 27 | | .00082 | 26, 29 | 29–28 |
| .00056 | 27, 28 | | .001 | 29, 27 | 26–29 |
| .0006 | 27, 28 | 26–29 | | | 27–28 |
| .00068 | 26, 28 | 26–27 | .0012 | 29, 27 | 29–28 |
| | | | .0013 | 26, 29 | 26–27 |

Use of dielectrics of the same two K values as for the two capacitors mentioned above, and with the dielectrics of the same thickness but otherwise of different proportions and with conductive coatings of the same general shape but of different size so that the overlapping areas are in the ratios of 1:1, 1:2, 1:4, 1:8, it is possible to obtain other capacitance values by various connections of the four leads. Thus a larger dielectric of K 1200 can provide the following range of capacitance values:

| microfarads | Terminals | Connect Leads | microfarads | Terminals | Connect Leads |
|---|---|---|---|---|---|
| .0006 | 26, 28 | | .0015 | 29, 28 | 26–28 |
| .00068 | 29, 28 | | .0016 | 29, 28 | 26–28 |
| .00075 | 29, 28 | 29–27 | | | 29–27 |
| .0008 | 27, 28 | 26–29 | .0018 | 29, 27 | |
| .00082 | 27, 28 | 26–27 | .002 | 26, 27 | 26–29 |
| .001 | 26, 28 | 27–28 | .0022 | 29, 27 | 26–28 |
| .0012 | 26, 29 | | .0025 | 27, 28 | 29–28 |
| .0013 | 26, 28 | 29–28 | .0027 | 29, 27 | 26–27 |

A capacitor with dielectric of K 3500 but otherwise identical with that immediately above will provide the following range of capacitance values specified in one RETMA group:

| microfarads | Terminals | Connect Leads | microfarads | Terminals | Connect Leads |
|---|---|---|---|---|---|
| .0025 | 26, 27 | | .005 | 27, 28 | 29–27 |
| .0033 | 26, 29 | 29–28 | .0068 | 26, 29 | 29–27 |
| .004 | 26, 28 | 26–29 | | | 26–28 |
| .0047 | 27, 28 | | .010 | 29, 27 | 29–28 |
| | | | .015 | 26, 29 | 26–27 |
| | | | | | 29–28 |

The two examples given of K 3500 dielectric cover the major portion of the RETMA range of capacitance in the single unit of GMV group. It will be understood that leads not used as terminals and which are not connected to either one of the two terminals or to other leads, are cut off.

It will thus be seen that dielectrics of the same thickness and of only two different K values but of two different breadths and lengths are herein disclosed. With two coatings on each side of the dielectrics, the coatings being of the same general shape but of different size, four constructions are obtained, each of which can be connected to produce a variety of capacitance values. Hence, a large percentage of capacitor replacements can be made from a relatively small stock of a few of the above four constructions. The four capacitors disclosed can replace forty-two standard capacitors with capacitance values ranging from 400 mmf. to .015 mf. and regardless of whether the replaced capacitors are ceramic plate or tube dielectric or other dielectric materials. It will be understood that making the dielectrics of different K values in different portions thereof, changing the shape and size of the dielectrics and changing the side effects between different coatings, can produce other variations of the present invention yielding different capacitance values even though the coatings remain of the same general shape and approximately the same size as herein disclosed.

We claim:

1. In a multi-capacitor unit for electric units, a ceramic dielectric of rectangular plate-like form, two conductive coatings on each of two opposite sides of the dielectric, one coating on each side of the dielectric having two legs and being substantially L-shaped with one leg along a side and the other leg across the width of the dielectric and the other coating on each side of the dielectric being substantially rectangular, each coating on one side partially overlapping both coatings on the other side, and the overlapping areas providing one area with capacitance of given value and other areas with capacitance in multiples of the given value ranging from 1 to 8, and leads electrically connected severally with each coating whereby use as terminals of any two such leads produces different capacitance values equal in number to the number of two-terminal combinations obtainable of all of the leads.

2. In a multi-capacitor unit for electric units, a ceramic dielectric of rectangular plate-like form, two conductive coatings on each of two opposite sides of the dielectric, one coating on each side of the dielectric having two legs and being L-shaped and the other coating on each side of the dielectric being substantially rectangular, one L-shaped coating having one leg extending along a side and having the other leg extending along an end of the dielectric, the other L-shaped coating having one leg extending along a side and having the other leg extending centrally across the width of the dielectric, each coating on one side partially overlapping portions of both coatings on the other side, and the overlapping areas providing one area with capacitance of given value and other areas with capacitance in multiples of the given value ranging from 1 to 8, and leads electrically connected severally with each coating whereby use as terminals of any two such leads produces different capacitance values equal in number to the number of two-terminal combinations obtainable of all of the leads.

3. In a multi-capacitor unit, a ceramic dielectric of rectangular plate-like form, two conductive coatings on each of the two opposite sides of the dielectric, one coating on each side of the dielectric having two legs and being L-shaped and the other coating on each side of the dielectric being substantially rectangular, one L-shaped coating having one leg extending along a side and having the other leg extending along an end of the dielectric and for substantially the full length and width thereof, the other L-shaped coating having one leg extending along a portion of the length and having the other leg thereof extending centrally across and for substantially the full width of the dielectric, each coating on one side partially overlapping a portion of each coating on the other side, the overlapping portions providing one area with capacitance of given value and other areas with capacitance in multiples of the given value from 1 to 8, and leads electrically connected severally with each coating whereby use of any two leads as terminals produces different capacitance values equal in number to the number of two-terminal combinations obtainable from all of the leads.

4. In a multi-capacitor unit, a ceramic dielectric of rectangular plate-like form, two conductive coatings on each of two opposite sides of the dielectric, one coating on each side of the dielectric having two legs and being substantially L-shaped with one leg along a side and the other leg across the width of the dielectric, the other coating on each side of the dielectric being substantially rectangular, each coating on one side partially overlapping each coating on the other side with the ratios of overlapped portions of opposite coatings ranging from 1:1 to 1:8, the overlapping areas providing one area of capacitance of given value and the other areas providing capacitance in multiples up to eight times the given value, and leads electrically connected severally with each coating whereby use of any two leads as terminals produces different capacitance values equal in number to the number of two-terminal combinations obtainable from all the leads.

5. In a multi-capacitor unit, a ceramic dielectric of rectangular plate-like form, two conductive coatings on each of opposite sides of the dielectric, each coating on one side partially overlapping a portion of each coating on the other side, one of the coatings on each side of the dielectric being substantially rectangular and the other coating on each side of the dielectric being substantially L-shaped with one leg along one side of the dielectric and the other leg across the width of the dielectric, the rectangular coating on the reverse side of the dielectric overlapping an end of one leg of the L-shaped coating on the front of the dielectric and a leg of the L-shaped coating on the reverse side of the dielectric overlapping a portion of the other leg of the L-shaped coating on the front side of the dielectric whereby the overlapped areas are in ratios of 1 to 8, and leads electrically connected severally with each coating whereby use of any two such leads as terminals produces different capacitance values equal in number to the number of two-terminal combinations obtainable from all of the leads.

6. In a multi-capacitor unit, a ceramic dielectric of rectangular plate-like form, two conductive coatings on each of opposite sides of the dielectric, each coating on one side partially overlapping a portion of each coating on the other side, one of the coatings on each side of the dielectric being substantially rectangular and the other coating on each side of the dielectric being substantially L-shaped with one leg along substantially the full length of one side of the dielectric and the other leg substantially completely across the width of the dielectric, the rectangular coating on the reverse side of the dielectric extending along one side and an end edge of the dielectric and overlapping an end of one leg of the L-shaped coating on the front of the dielectric and a leg of the L-shaped coating on the reverse side of the dielectric overlapping a portion of the length and substantially the full width of the other leg of the L-shaped coating on the front side of the dielectric whereby the overlapped areas are in whole-number ratios of 1 to 8, and leads electrically connected severally with each coating whereby use of any two such leads as terminals produces different capacitance values equal in number to the number of two-terminal combinations obtainable from all of the leads.

References Cited in the file of this patent

UNITED STATES PATENTS

| 1,707,959 | Fried | Apr. 2, 1929 |
| 2,470,893 | Hepp | May 24, 1949 |
| 2,665,376 | Kodama | Jan. 5, 1954 |

FOREIGN PATENTS

| 474,754 | Great Britain | Nov. 5, 1937 |
| 821,242 | Germany | Nov. 15, 1951 |